United States Patent
Schnur et al.

[15] 3,654,539
[45] Apr. 4, 1972

[54] AC-DC CONVERTER

[72] Inventors: Earl J. Schnur, Lake Orion; Angelo N. Vinch, Warren, both of Mich.

[73] Assignee: Westinghouse Electric Corporation, Pittsburgh, Pa.

[22] Filed: Feb. 11, 1972

[21] Appl. No.: 114,502

[52] U.S. Cl. ............................321/8 R, 307/231, 307/261, 328/32
[51] Int. Cl. ............................H02m 7/00, H03k 5/20
[58] Field of Search ............................330/26–28; 329/102, 109, 206; 328/26, 28, 32, 115–117, 150; 307/231, 240, 246, 261; 321/8, 47; 317/DIG. 5

[56] References Cited

UNITED STATES PATENTS

| | | |
|---|---|---|
| 2,336,268 | 12/1943 | Littwin ............................328/26 |
| 2,977,510 | 3/1961 | Adamson et al. ............................317/DIG. 5 |
| 3,001,100 | 9/1961 | Schuh et al. ............................317/DIG. 5 |
| 3,281,718 | 10/1966 | Weberg ............................330/28 |
| 3,315,246 | 4/1967 | Huffman et al. ............................317/DIG. 5 |
| 3,460,050 | 8/1969 | Hellstrom ............................330/28 |

*Primary Examiner*—William H. Beha, Jr.
*Attorney*—A. T. Stratton and Clement L. McHale

[57] ABSTRACT

An AC-DC converter for converting relatively large AC voltages to relatively small DC voltages. The AC input circuitry of the converter comprises two zener diodes back-to-back in series with a resistor and the primary of a transformer. The circuitry in the transformer secondary supplies spaced pulses of similar polarity to a transistor circuit. The transistor circuit includes a capacitor and resistors whose values may be varied to vary the response of the converter. The output of the converter is taken across the collector-emitter of the transistor.

18 Claims, 1 Drawing Figure

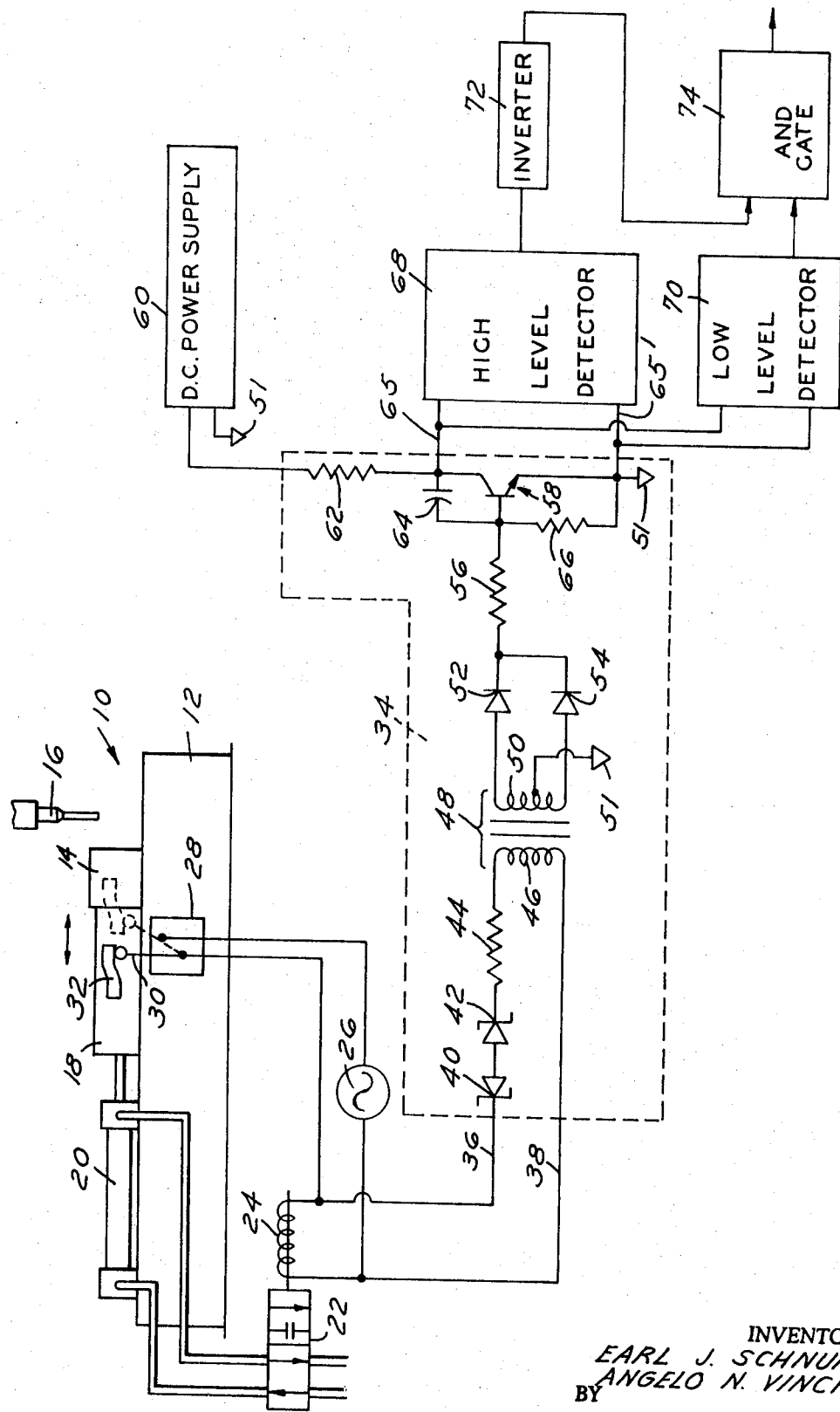

AC-DC CONVERTER

This invention relates generally to AC-DC converters and particularly to apparatus for converting relatively large AC voltages such as 110 VAC used in conventional machine tool control circuitry to relatively small DC voltages such as 24 VDC for solid state logic devices used in controlling the operating sequence of a machine tool. The increased use of automatic controls of the solid state logic type for machine tools has occasioned the need for integrating the conventional AC machine tool circuitry with the DC circuitry of the solid state components.

In the past, both electromechanical relays and solid state type converters have been used for this purpose, but they often have some undesirable features. In the case of a relay, its life is limited thereby necessitating replacement during the life of the machine tool. In addition, the pull-in and pull-out times of the relay contacts may often be undesirably long for the solid state logic circuitry. When replacing a relay, especially one which has a relatively large number of contacts, there is the increased likelihood that the AC and DC power which are both supplied to the relay will be intermixed. The application of the high voltage AC to the expensive electronic logic equipment can cause extensive damage and result in machine downtime. In connection with the previous solid state type converters, they often occupy a relatively large amount of space and are relatively complex and costly. Also, relatively complicated changes must be made in the circuitry of these converters to vary their response characteristics for a given application.

Therefore, it is an object of this invention to provide an improved AC-DC converter for machine tool circuitry in which the possibility of intermixing the AC and DC power is less likely.

It is also an object of the invention to provide an improved AC-DC converter for machine tool circuitry which has a relatively fast response time.

Still another object of the invention is to provide an AC-DC converter for a machine tool whose response characteristics may be selected for a given application by changing the circuit values of only a few circuit components.

Another object of the invention is the provision of a solid state type AC-DC converter for machine tool circuitry which is inexpensive to manufacture, is highly reliable, and occupies a small amount of space.

Other objects and features of the invention will be apparent in the specification and the drawing which shows the electrical schematic diagram of the AC-DC converter of the present invention connecting a portion of the AC circuitry of a machine tool with a portion of the DC solid state logic circuitry of the machine tool.

Referring now to the drawing, a machine tool 10 comprises a base 12 along which a workpiece 14 is being horizontally moved toward a cutter 16 by means of a ram 18. Ram 18 is driven by a power cylinder 20 which is hydraulically connected to a valve 22 which is in turn electrically actuated by a solenoid 24. Solenoid 24 is electrically connected in series circuit with an AC power supply 26 and a normally open limit switch 28 which is mounted on base 12. The actuating lever 30 of limit switch 28 is positioned to be tripped by a cam 32 on ram 18 such that switch 28 is closed when the ram is at one limit of travel. Closure of switch 28 causes solenoid 24 to be energized by power supply 26. As a result, valve 22 is shifted to thereby arrest the movement of ram 18.

The AC-DC converter 34 of the present invention is connected by input leads 36 and 38 across solenoid 24. The input circuit of converter 34 comprises two zener diodes 40 and 42 connected back-to-back in series with a resistor 44 and the primary coil 46 of a transformer 48. The secondary 50 of transformer 48, whose center tap is connected to DC common 51, is connected at its two outer terminals through two diodes 52 and 54 whose cathodes are tied together at one terminal of a resistor 56. The other terminal of resistor 56 is connected to the base of a transistor 58. The emitter of transistor 58 is connected to DC common 51 and its collector is supplied from a DC power supply 60 through a resistor 62. In addition, the base of transistor 58 is connected to its collector and to its emitter by a capacitor 64 and a resistor 66 respectively. The output of converter 34 is taken between the collector and emitter of transistor 58 and is supplied along lines 65 and 65' to a plurality of succeeding solid state logic modules such as a high level detector 68, a low level detector 70, an inverter 72 and an and-gate 74. These logic modules operate exclusively at a relatively low DC voltage level, preferably the same as that of supply 60.

The operation of converter 34 is now described for each of two operating conditions; namely, (1) when switch 28 is open and no voltage is applied across solenoid 24, and (2) when switch 28 is closed so as to apply full line voltage across solenoid 24. In the first condition, since there is no voltage input to converter 34, the output voltage thereof is determined by the circuitry connected to transistor 58 comprising resistors 62 and 66, capacitor 64 and power supply 60. The values of these components are such that capacitor 64 becomes charged to the same voltage as that of supply 60 and in this state operates to maintain transistor 58 non-conducting. With transistor 58 non-conducting, the output voltage of converter 34 is essentially equal to the voltage of supply 60. This condition remains stable until the second condition occurs, that is, the closure of switch 28.

With the AC voltage of source 26 applied to the input circuitry of converter 34, a series of spaced single polarity pulses is supplied at the common cathodes of diodes 52 and 54. The spacing and magnitude of the pulses is controlled by the input circuitry of converter 34 which comprises zener diodes 40 and 42. The single polarity feature of these pulses is obtained by using the rectifying connection of diodes 52 and 54 to transformer secondary 50. For example, if 110 VAC 60 CPS power is supplied to converter 34 and if zeners 40 and 42 have a reverse breakdown characteristic of approximately 80 volts, then spaced pulses of alternating polarity are supplied to primary 46 at a rate of 120 pulses per second. Increasing the reverse breakdown characteristic of zeners 40 and 42 causes the alternating pulses to decrease in amplitude and to be increasingly spaced apart, and does not change the pulse repetition rate.

The appearance of the first pulse at the base of transistor 58 biases the transistor for conduction. As a result, collector current is simultaneously drawn from capacitor 64 directly and from power supply 60 through resistor 62. Because a controlled impedance path is now present through the collector-emitter circuit of transistor 58, capacitor 64 which in part controls the fall rate of the collector voltage discharges at a rate controlled by the current available from diodes 52 and 54. Increasing the value of resistor 56 decreases this rate and vice versa. Consequently, the output of converter 34 begins to fall to a low voltage level. While the current available from the first pulse may be sufficient to completely discharge capacitor 64, it should be appreciated that several pulses may be required depending upon the values of resistors 56 and 66 in relation to the amplitude of the rectified voltage pulse at the cathodes of diodes 52 and 54. When the pulses disappear, transistor 58 remains temporarily biased for conduction but for a different reason. Immediately upon the disappearance of the pulses, the series circuit path comprising resistor 62, capacitor 64 and resistor 66 begins drawing current from source 60 to start charging capacitor 64. This current produces a sufficient voltage drop across resistor 66 to temporarily maintain transistor 58 in the conducting state. However, when capacitor 64 once again becomes fully charged, transistor 58 is rendered non-conducting and the output of converter 34 returns to the high voltage level. It should be recognized that the values of resistors 62 and 66, capacitor 64 in relation to power supply 60 are such that the output of converter 34 cannot rise to the high voltage level during the time between input pulses to transistor 58. As long as pulses from the input circuitry of converter 34 keep appearing at the base of transistor 58, the output voltage of converter 34 is maintained at its low level. By way of example, the following components have been successfully employed in converter 34 to perform the function just described:

| | |
|---|---|
| zener diodes 40, 42 | 81V ± 10% (breakdown) |
| resistor 44 | 6.8 kohms |
| diodes 52, 54 | 1N914B |
| resistor 56 | 47 ohms |
| transistor 58 | 2N3643 |
| power supply 60 | +24 VDC |
| resistor 62 | 2.7 kohms |
| capacitor 64 | 1 micro fd. |
| resistor 66 | 680 ohms |
| transformer 48 | Better Coil and Transformer Corp. Model No. 8317023 |

The use of these specific components is intended to be merely exemplary to set forth a specific functional embodiment which has been successfully operated.

As was previously noted, zener diodes 40 and 42 have a breakdown voltage of approximately 80 volts to prevent converter 34 from responding to inputs less than 80 volts. This level is sufficiently high to prevent converter 34 from responding to stray transient voltages. The selection of different zener diodes 40 and 42 would change the width of the pulses, and in conjunction the response of converter 34 to transients would be changed. The use of resistor 44 in series with the AC input permits transformer 48 to be of relatively small size to thus reduce the space occupied by converter 34.

In other ways, the response characteristics of converter 34 may be varied by selecting components of different values. More specifically, the values of resistors 56 and 66 and capacitor 64 control the discharge rate of capacitor 64 when input pulses are received from diodes 52 and 54. The charging rate of capacitor 64 on the other hand is determined by the values of capacitor 64 and resistors 62 and 66. It will be recognized that numerous variations may be made in the values of these components to thereby change the response characteristics of converter 34.

Converter 34 is particularly useful in connection with machine tool circuitry because it has only four terminals available for external connection and consequently, the likelihood of misconnecting the terminals to the AC machine tool circuitry and the DC logic circuitry is greatly reduced. The components of converter 34 may be conveniently encapsulated or card-mounted to provide a small package size which may be assembled into a control panel or the like. In a complex machine tool circuit, one converter 34 is required for each AC voltage which is to be monitored. The output of each converter 34 may be used to drive a plurality of succeeding logic stages such as 68 through 74.

Thus, there has been provided an improved AC-DC converter which is of compact size and high reliability and which has selectable response characteristics to accommodate a wide variety of applications and to integrate the conventional high voltage AC machine tool circuitry with a plurality of low voltage solid state logic devices. It should also be noted that the converter may be used to monitor any one of the many types of electrical devices which are used in machine tool circuitry.

We claim:

1. An AC-DC converter comprising input circuit means adapted to be connected to an AC voltage input source, output circuit means adapted to supply a DC output signal in response to the presence of an AC signal at the input circuit means and means responsive to said AC signal for generating a series of pulses of similar polarity, said output circuit means comprising means for storing electrical energy such that the DC signal supplied by said output means is maintained by the energy in said energy-storage means at a first signal level in the absence of said series of pulses, solid state switch means responsive to said pulses for releasing the energy in said storage means such that the signal supplied by said output circuit means is switched to a second signal level and means for replenishing the energy in said energy-storage means in the absence of pulses such that the signal supplied by said output circuit means is switched back to its first signal level.

2. The converter called for in claim 1 wherein said means for replenishing the energy in said energy-storage means comprises a DC power supply.

3. The converter called for in claim 1 wherein said pulse generating means comprises means for generating said pulses at a repetition rate synchronous with a multiple of the frequency of the AC voltage input source.

4. The converter called for in claim 1 wherein said pulse generating means comprises means for generating said pulses at spaced intervals, the repetition rate of said pulses being synchronous with a multiple of the frequency of the AC voltage input source.

5. The converter called for in claim 1 wherein said pulse generating means comprises voltage-sensitive means responsive to a predetermined level of the AC input voltage.

6. The converter called for in claim 5 wherein said last-mentioned means comprises a pair of zener diodes placed back-to-back in series with the input circuit means.

7. The converter called for in claim 1 wherein said pulse generating means comprises transformer means electrically connected to said input circuit means and rectifying means electrically connected to the output of said transformer means for providing said pulses.

8. The converter called for in claim 7 further including resistance means in series with said input circuit means.

9. The converter called for in claim 1 wherein said solid state switch means comprises a transistor having a terminal electrically connected to said pulse generating means, said solid state switch means being rendered conductive by the appearance of said pulses at said terminal to thereby present an electrical circuit path for releasing the energy in said energy-storage means whereby the DC output signal is switched from said first level to said second level.

10. The converter called for in claim 9 wherein said energy-storage means comprises a capacitor electrically connected to said transistor such that the appearance of pulses at said one terminal of said transistor causes the transistor to present a controlled impedance path through which said capacitor is discharged whereby the DC output signal is switched from said first level to said second level.

11. The converter called for in claim 10 wherein said one terminal is the base terminal of said transistor and said capacitor is electrically connected to another terminal of said transistor.

12. The converter called for in claim 11 wherein said capacitor is electrically connected between the base and the collector of said transistor.

13. The converter called for in claim 12 further including resistance means connected between the base and the emitter of said transistor.

14. The converter called for in claim 1 wherein the output circuit means is constructed such that the appearance of a predetermined number of pulses at said solid state switch means causes the DC output signal to be switched from said first level to said second level.

15. The converter called for in claim 1 wherein said output circuit means comprises alternate paths for releasing and replenishing said energy-storage means.

16. The converter called for in claim 15 wherein said energy-storage means comprises a capacitor electrically connected to said solid state switch means such that in the absence of said pulses said capacitor is charged through one of said alternate paths whereby said DC output signal is switched to and maintained at said first level and such that in the presence of pulses said capacitor is discharged through the other of said alternate paths whereby said DC output signal is switched to said second level.

17. The converter called for in claim 16 wherein said solid state switch means comprises a transistor having its base terminal electrically connected through resistance means to said pulse generating means.

18. The converter called for in claim 17 wherein said capacitor is connected between the base and the collector of said transistor and wherein said resistance means and said capacitor substantially determine the switching time required to switch the DC output from the first level to the second level.

* * * * *